United States Patent
Jalali et al.

(10) Patent No.: US 9,571,180 B2
(45) Date of Patent: Feb. 14, 2017

(54) UNMANNED AERIAL VEHICLE (UAV) BEAM FORMING AND POINTING TOWARD GROUND COVERAGE AREA CELLS FOR BROADBAND ACCESS

(71) Applicant: Ubiqomm LLC, San Diego, CA (US)

(72) Inventors: Ahmad Jalali, San Diego, CA (US); Leonard Schiff, San Diego, CA (US)

(73) Assignee: UBIQOMM LLC, San Diego, CA (US)

( * ) Notice: Subject to any disclaimer, the term of this patent is extended or adjusted under 35 U.S.C. 154(b) by 58 days.

(21) Appl. No.: 14/516,491

(22) Filed: Oct. 16, 2014

(65) Prior Publication Data
US 2016/0112116 A1 Apr. 21, 2016

(51) Int. Cl.
| | |
|---|---|
| H04B 7/185 | (2006.01) |
| H04W 24/10 | (2009.01) |
| H04W 72/08 | (2009.01) |
| H04W 16/28 | (2009.01) |
| H04B 7/06 | (2006.01) |
| H04W 88/02 | (2009.01) |

(52) U.S. Cl.
CPC ......... *H04B 7/18504* (2013.01); *H04W 16/28* (2013.01); *H04W 24/10* (2013.01); *H04W 72/085* (2013.01); *H04B 7/0617* (2013.01); *H04W 88/02* (2013.01)

(58) Field of Classification Search
None
See application file for complete search history.

(56) References Cited

U.S. PATENT DOCUMENTS

| | | | |
|---|---|---|---|
| 3,780,303 | A | 12/1973 | Smith et al. |
| 4,209,695 | A | 6/1980 | Arnold et al. |
| 4,278,885 | A | 7/1981 | Von Alfthan et al. |
| 4,317,993 | A | 3/1982 | Hertzog, Jr. et al. |

(Continued)

FOREIGN PATENT DOCUMENTS

| | | |
|---|---|---|
| CA | 2316440 A1 | 2/2001 |
| EP | 2369361 A1 | 9/2011 |

(Continued)

OTHER PUBLICATIONS

Goldsmith AJ., et al., "Design Challenges for Energy-Constrained Ad Hoc Wireless Networks," Wireless Communications, IEEE, 2002, vol. 9 (4), pp. 8-27.

*Primary Examiner* — Anh-Vu Ly
(74) *Attorney, Agent, or Firm* — Gazdzinski & Associates, PC

(57) ABSTRACT

Systems and methods configured to form and point beams from an unmanned aerial vehicle (UAV) toward target cells in a coverage area on the ground. One embodiment determines and forms the required number of UAV fixed beams needed to cover the target area when UAV is at its highest altitude and highest roll/pitch/yaw angles so that the target coverage area is covered under all UAV altitude and orientation conditions. In another embodiment, UAV determines the beam pointing angles toward different cells on the ground using information on position coordinates and orientation angles of the UAV, and the position coordinates of the cells in the coverage area relative to the center of coverage area. In another embodiment, a reference terminal placed at the center of coverage is used by the UAV to optimally point a beam toward center of the coverage area.

18 Claims, 10 Drawing Sheets

(56) References Cited

U.S. PATENT DOCUMENTS

| | | | |
|---|---|---|---|
| 4,365,154 A | 12/1982 | Arnold et al. | |
| 4,387,302 A | 6/1983 | Givens | |
| 4,499,380 A | 2/1985 | Aggour et al. | |
| 4,851,687 A | 7/1989 | Ettinger et al. | |
| 5,021,664 A | 6/1991 | Hinshaw | |
| 5,068,532 A | 11/1991 | Wormald et al. | |
| 5,076,993 A | 12/1991 | Sawa et al. | |
| 5,098,640 A | 3/1992 | Gozani et al. | |
| 5,239,568 A | 8/1993 | Grenier | |
| 5,521,817 A | 5/1996 | Burdoin et al. | |
| 5,712,885 A | 1/1998 | Sowerby et al. | |
| 5,832,379 A | 11/1998 | Mallinckrodt | |
| 6,018,659 A | 1/2000 | Ayyagari et al. | |
| 6,034,634 A | 3/2000 | Karlsson et al. | |
| 6,044,323 A | 3/2000 | Yee et al. | |
| 6,061,562 A | 5/2000 | Martin et al. | |
| 6,108,538 A | 8/2000 | Blasiak et al. | |
| 6,144,032 A | 11/2000 | Gazdzinski | |
| 6,256,476 B1 | 7/2001 | Beamish et al. | |
| 6,513,758 B1 | 2/2003 | Lloyd | |
| 6,628,941 B2 | 9/2003 | Knoblach et al. | |
| 6,718,161 B1 | 4/2004 | Westall et al. | |
| 6,756,937 B1 | 6/2004 | Chang et al. | |
| 6,856,803 B1 | 2/2005 | Gross et al. | |
| 7,095,376 B1 | 8/2006 | Timothy et al. | |
| 7,212,170 B1 | 5/2007 | Dean et al | |
| 7,777,674 B1 | 8/2010 | Haddadin et al. | |
| 8,078,162 B2 | 12/2011 | Deaton et al. | |
| 8,116,763 B1 | 2/2012 | Olsen | |
| 8,183,999 B1* | 5/2012 | Giallorenzi | G08B 21/0266 340/539.13 |
| 8,190,147 B2 | 5/2012 | Kauffman et al. | |
| 8,558,734 B1 | 10/2013 | Piesinger | |
| 8,897,770 B1 | 11/2014 | Frolov et al. | |
| 9,100,086 B1 | 8/2015 | Olsen | |
| 9,119,179 B1* | 8/2015 | Firoiu | H04W 16/18 |
| 2002/0061730 A1 | 5/2002 | Hart et al. | |
| 2002/0168974 A1 | 11/2002 | Rosen et al. | |
| 2003/0040274 A1 | 2/2003 | Dai et al. | |
| 2003/0095067 A1 | 5/2003 | Howell | |
| 2003/0223354 A1 | 12/2003 | Olszewski | |
| 2004/0038658 A1 | 2/2004 | Gurelli et al. | |
| 2004/0152480 A1 | 8/2004 | Willars et al. | |
| 2005/0035897 A1* | 2/2005 | Perl | G01S 13/878 342/29 |
| 2005/0143005 A1 | 6/2005 | Moore | |
| 2005/0243005 A1 | 11/2005 | Rafi et al. | |
| 2005/0264438 A1 | 12/2005 | Fullerton et al. | |
| 2006/0009262 A1 | 1/2006 | Hamm | |
| 2006/0063566 A1 | 3/2006 | Maruta | |
| 2006/0238411 A1 | 10/2006 | Fullerton et al. | |
| 2007/0090990 A1 | 4/2007 | Nelson | |
| 2007/0184849 A1 | 8/2007 | Zheng | |
| 2007/0230419 A1 | 10/2007 | Raman et al. | |
| 2008/0090606 A1 | 4/2008 | Hwang et al. | |
| 2008/0233865 A1 | 9/2008 | Malarky et al. | |
| 2009/0092072 A1 | 4/2009 | Imamura et al. | |
| 2009/0209277 A1 | 8/2009 | Pinchas et al. | |
| 2009/0219912 A1 | 9/2009 | Wengerter et al. | |
| 2010/0085236 A1 | 4/2010 | Franceschini et al. | |
| 2010/0172299 A1 | 7/2010 | Fischer et al. | |
| 2010/0224732 A1 | 9/2010 | Olson et al. | |
| 2010/0273504 A1 | 10/2010 | Bull et al. | |
| 2010/0284377 A1 | 11/2010 | Wei et al. | |
| 2010/0290412 A1 | 11/2010 | Ahn et al. | |
| 2011/0032149 A1 | 2/2011 | Leabman | |
| 2011/0103293 A1 | 5/2011 | Gale et al. | |
| 2011/0122024 A1 | 5/2011 | Eidloth et al. | |
| 2011/0142150 A1 | 6/2011 | Anigstein et al. | |
| 2011/0182230 A1 | 7/2011 | Ohm et al. | |
| 2011/0286325 A1 | 11/2011 | Jalali et al. | |
| 2011/0286372 A1 | 11/2011 | Taghavi Nasrabadi et al. | |
| 2012/0052828 A1 | 3/2012 | Kamel et al. | |
| 2012/0202430 A1 | 8/2012 | Jalali et al. | |
| 2012/0235863 A1 | 9/2012 | Erdos et al. | |
| 2013/0070677 A1* | 3/2013 | Chang | G01S 13/9303 370/328 |
| 2013/0109299 A1 | 5/2013 | Roos | |
| 2013/0155847 A1 | 6/2013 | Li et al. | |
| 2013/0156021 A1 | 6/2013 | Ashikhmin et al. | |
| 2013/0303080 A1 | 11/2013 | Moreno | |
| 2013/0321204 A1 | 12/2013 | Zahavi et al. | |
| 2013/0331026 A1 | 12/2013 | O'Neill et al. | |
| 2014/0003302 A1 | 1/2014 | Han et al. | |
| 2014/0003394 A1 | 1/2014 | Rubin et al. | |
| 2014/0049643 A1 | 2/2014 | Segerstrom et al. | |
| 2014/0073337 A1 | 3/2014 | Hong et al. | |
| 2014/0105054 A1* | 4/2014 | SæGrov | H01Q 3/2605 370/252 |
| 2014/0139372 A1 | 5/2014 | Seol et al. | |
| 2014/0241239 A1 | 8/2014 | Chang | |
| 2014/0335817 A1 | 11/2014 | Hyde et al. | |
| 2014/0347223 A1* | 11/2014 | Hyde | H01Q 3/00 342/385 |
| 2014/0348140 A1 | 11/2014 | Atkinson | |
| 2015/0142966 A1 | 5/2015 | Baran et al. | |
| 2015/0236778 A1 | 8/2015 | Jalali | |
| 2015/0236779 A1* | 8/2015 | Jalali | H04W 16/28 342/367 |
| 2015/0236780 A1* | 8/2015 | Jalali | H04B 7/18504 455/13.4 |
| 2015/0236781 A1 | 8/2015 | Jalali | |
| 2015/0237569 A1 | 8/2015 | Jalali | |
| 2015/0280812 A1* | 10/2015 | Jalali | H04W 40/22 455/431 |
| 2015/0304885 A1 | 10/2015 | Jalali | |
| 2015/0362917 A1* | 12/2015 | Wang | G05D 1/0011 701/2 |
| 2016/0088498 A1 | 3/2016 | Sharawi | |

FOREIGN PATENT DOCUMENTS

| | | |
|---|---|---|
| EP | 2801838 A1 | 11/2014 |
| WO | WO-2014007873 A2 | 1/2014 |

\* cited by examiner

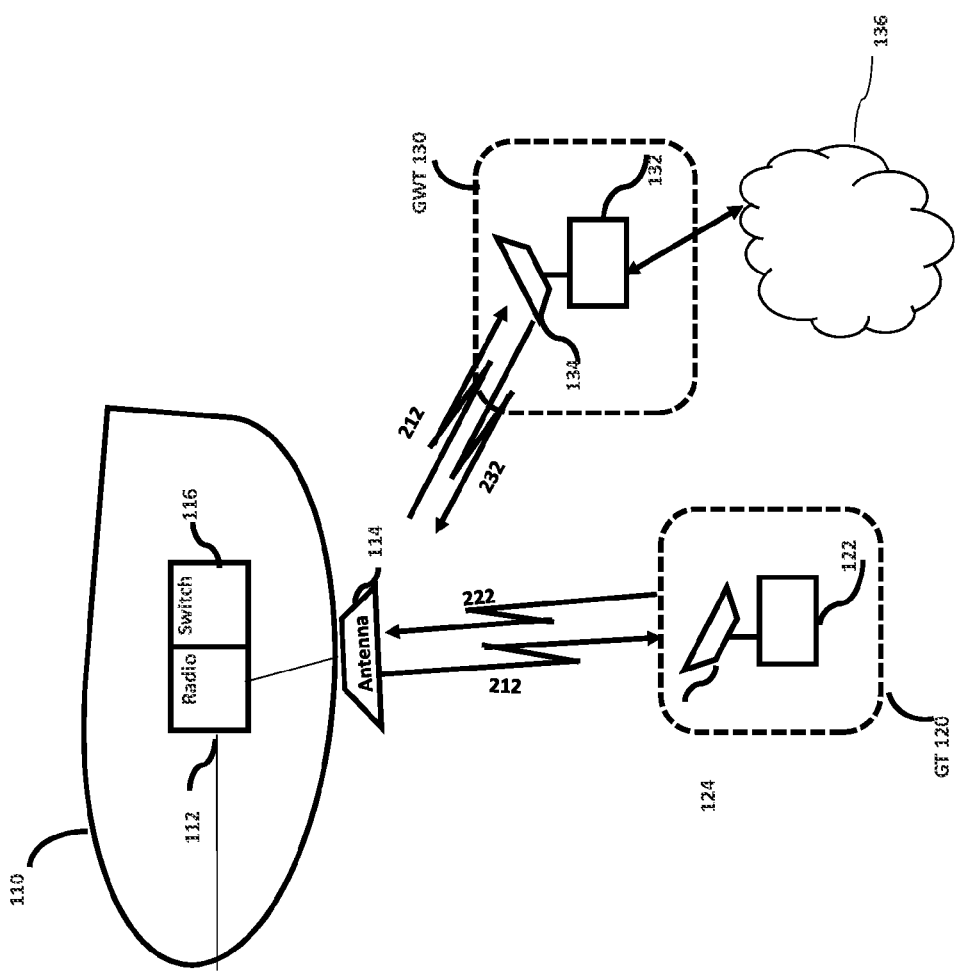

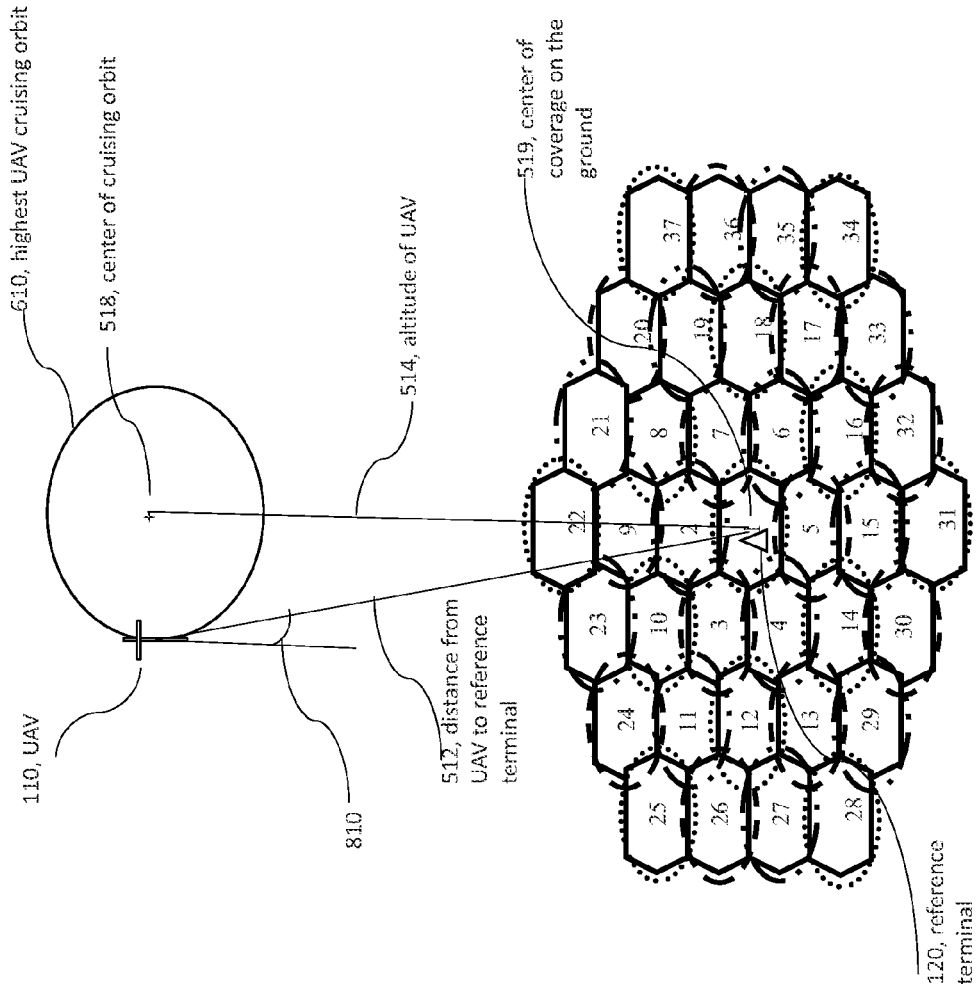

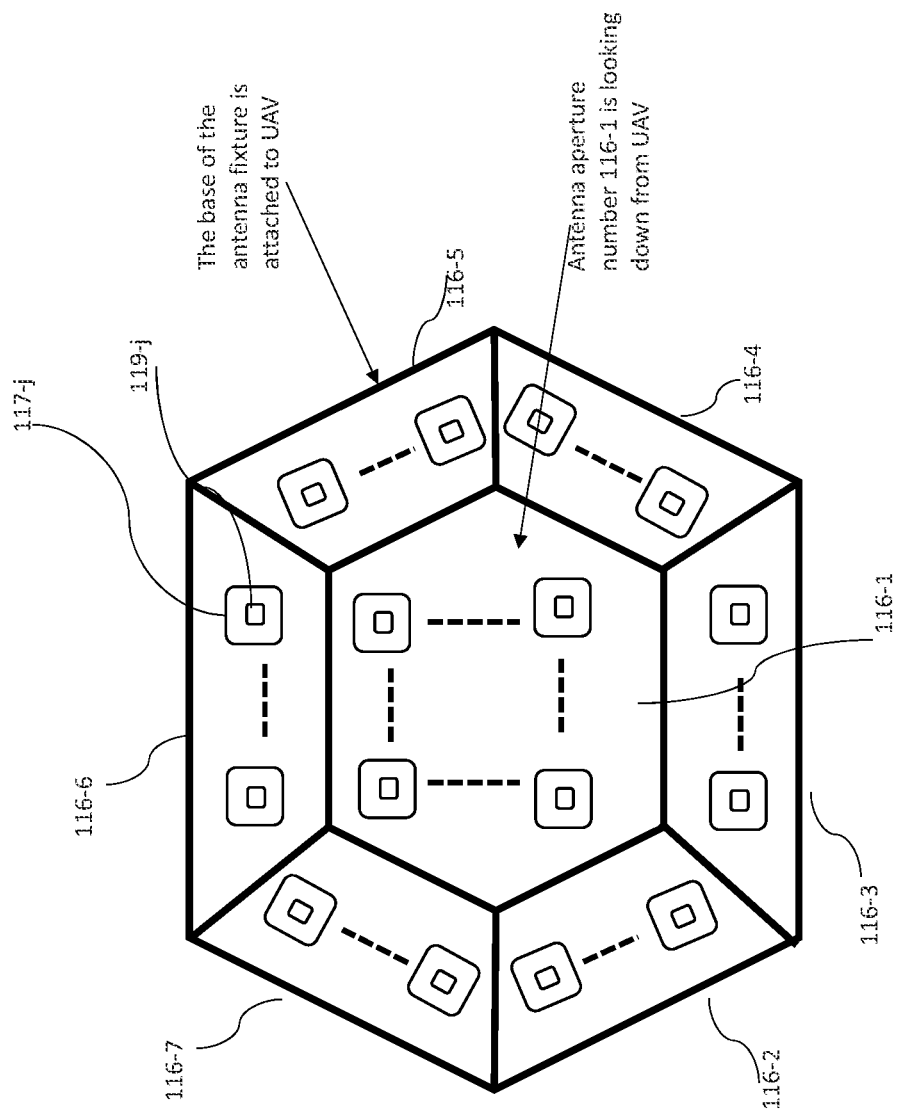

UNMANNED AERIAL VEHICLE (UAV) BEAM FORMING AND POINTING TOWARD GROUND COVERAGE AREA CELLS FOR BROADBAND ACCESS

RELATED APPLICATIONS

This application is related to co-owned, co-pending, U.S. patent application Ser. No. 14/486,916, entitled "ANTENNA BEAM MANAGEMENT AND GATEWAY DESIGN FOR BROADBAND ACCESS USING UNMANNED AERIAL VEHICLE (UAV) PLATFORMS", filed on Sep. 15, 2014, co-owned, co-pending, U.S. patent application Ser. No. 14/295,160, entitled "METHODS AND APPARATUS FOR MITIGATING FADING IN A BROADBAND ACCESS SYSTEM USING DRONE/UAV PLATFORMS", filed on Jun. 3, 2014, co-owned, co-pending, U.S. patent application Ser. No. 14/222,497, entitled "BROADBAND ACCESS TO MOBILE PLATFORMS USING DRONE/UAV", filed on Mar. 21, 2014, and co-owned, co-pending. U.S. patent application Ser. No. 14/223,705, entitled "BROADBAND ACCESS SYSTEM VIA DRONE/UAV", filed on Mar. 24, 2014, each of the foregoing incorporated by reference herein in its entirety.

COPYRIGHT

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

BACKGROUND

1. Technological Field

The present disclosure describes aspects of a system for broadband internet access using unmanned aerial vehicles (UAVs) to relay internet traffic among different types of terminals. The present disclosure describes systems and methods for optimally pointing the beams of a UAV toward a coverage area on the ground, and adjusting the beams toward the ground coverage area based on the UAV's altitude, movements, and motions (such as roll/pitch).

2. Description of Related Technology

As internet traffic has increased, new technologies are needed to deliver broadband access to homes and enterprises at lower cost and to places that are not yet covered. Examples of current broadband delivery systems include terrestrial wired networks such as DSL (Digital Subscriber Line) on twisted pair, fiber delivery systems such as FiOS (Fiber Optic Service), and geo-stationary satellite systems. The current broadband access systems have a number of short comings. One issue is that there is a lack of service provided to remote and/or lightly populated areas. Geo-stationary satellites do provide service in remote areas of the developed world such as the United States. However, poorer areas of the world lack adequate satellite capacity.

A notable reason satellite capacity has not been adequately provided in poorer regions of the world is the relatively high cost of satellite systems. Due to adverse atmospheric effects in satellite orbits, satellite hardware must be space qualified and is costly. Launch vehicles to put the satellites in orbit are also costly. Moreover, due to the launch risk and the high cost of satellites, there may be significant insurance costs for the satellite and the launch. Therefore, broadband satellite systems and services are relatively costly and difficult to justify, particularly in poorer regions of the world. It is also costly to deploy terrestrial systems such as fiber or microwave links in lightly populated regions. The small density of subscribers does not justify the deployment cost.

Hence what are needed are improved methods and apparatus for providing broadband access to consumers. Ideally such methods and apparatus would rely on an inexpensive technology which avoids costs associated with launching and maintaining satellites.

SUMMARY

The present disclosure describes, inter alia, systems and methods for optimally pointing the beams of an unmanned aerial vehicle (UAV) toward a coverage area on the ground, and adjusting the beams toward the ground coverage area based on the UAV's altitude, movements, and motions (such as roll/pitch).

In a first aspect, an unmanned aerial vehicle (UAV) apparatus configured to form antenna beams toward at least one target coverage cell is disclosed. In one embodiment the UAV apparatus includes: an antenna fixture configured to form at least one beam; a set of radio transmitters and receivers configured to transmit and receive signals to a set of ground terminals within the at least one target coverage cell; a processor sub-system; and a non-transitory computer readable medium. In one exemplary embodiment, the non-transitory computer readable medium includes one or more instructions which, when executed by the processor sub-system, is configured to cause the UAV apparatus to: generate at least one beam that covers the at least one target coverage cell where the generated at least one beam encompasses at least one ground terminal of the set of ground terminals.

In one variant, the one or more instructions are further configured to cause the UAV apparatus to: compute a required number of fixed beams to cover the at least one target coverage cell under a plurality of UAV altitudes and orientation angles; and the generated at least one beam comprises the computed number of fixed beams.

In another variant, the non-transitory computer readable medium is further configured to store one or more first position location coordinates corresponding to one or more coverage areas;
where for at least one coverage area of the one or more coverage areas, the non-transitory computer readable medium is further configured to store one or more second position location coordinates of target cells relative to a center of the at least one coverage area; and where the non-transitory computer readable medium further comprises one or more instructions that are configured to cause the UAV apparatus to: obtain one or more third position location coordinates and orientation angles of the UAV apparatus based on at least one of a gyroscope, an accelerometer and a position location sub-system; and compute one or more pointing angles from the antenna fixture toward the target cells based at least in part on the second position location coordinates, the third position location coordinates, and the orientation angles of the UAV apparatus.

In still another variant, the antenna fixture is configured to receive a reference signal from a reference terminal associated with the at least one target coverage cell; measure one or more signal quality measurements based on the reference signal received from the reference terminal; and determine one or more pointing angles toward the reference terminal that optimizes the measured one or more signal quality measurements.

In another variant, the one or more instructions are further configured to cause the UAV apparatus to determine one or more relative position coordinates of one or more cells in one or more rings of cells surrounding a central cell associated with the at least one target coverage cell. In one such case, the one or more instructions are further configured to cause the UAV apparatus to determine a Round Trip Delay (RTD) between the UAV apparatus and the reference terminal; estimate the altitude of the UAV based at least in part on the RTD; and compute one or more pointing angles for each beam from the UAV apparatus based at least in part on one or more orientation angles, the estimated altitude, and the one or more relative position coordinates of the one or more cells in the one or more rings of cells surrounding the central cell.

In still another such implementation, the antenna fixture is comprised of multiple antenna sub-apertures, where each sub-aperture is configured to form at least one beam; each sub-aperture is controlled by an actuator; and the one or more instructions are further configured to cause the actuators to: point each sub-aperture toward a corresponding cell according to the computed pointing angles.

In other such variants, the antenna fixture is comprised of multiple antenna elements spaced apart at substantially half wavelength distances; the antenna sub-system comprises circuitry configured to phase the multiple antenna elements to form and point beams; and the one or more instructions are further configured to cause the antenna sub-system to point the beams according to the computed pointing angles. For example, in one such variant, the antenna fixture comprises multiple antenna elements spaced apart at substantially half wavelength distances; the antenna sub-system is configured to phase the multiple antenna elements to form and point beams.

In one aspect of the present disclosure, a reference terminal apparatus configured to generate a reference signal is disclosed. In one embodiment the reference terminal apparatus includes: an antenna fixture configured to transmit a reference signal; a processor sub-system; and
a non-transitory computer readable medium comprising one or more instructions. In one exemplary embodiment, the one or more instructions, when executed by the processor sub-system, are configured to cause the reference terminal apparatus to: transmit the reference signal; search for a reference signal response sent by an unmanned aerial vehicle (UAV); measure the signal quality of the reference signal response; and determine a Round Trip Delay (RTD) between the UAV and the reference terminal apparatus based on the reference signal response.

In one variant, the antenna fixture is configured to generate a beam which is narrower than an orbit of the UAV. In such variants the antenna fixture may additionally be configured to iteratively generate the beam within at least one sub-region of the orbit of UAV. In one such exemplary case, the iteratively generated beam within the at least one sub-region is generated for a duration of time which is substantially equal to a cruising orbit duration of the UAV.

In another variant, the antenna fixture is configured to generate a beam which completely encompasses an orbit of the UAV.

Other variants may be further configured to transmit one or more location coordinates corresponding to one or more target cell coverage areas.

In a third aspect, a method for forming antenna beams toward at least one target coverage cell is disclosed. In one embodiment the method includes: determining a first location coordinate of an aerial platform; determining an orientation of the aerial platform; identifying one or more second location coordinates associated with the at least one target coverage cell; computing one or more pointing angles based at least in part on the first and one or more second location coordinates and the orientation; and generating at least one beam that covers the at least one target coverage cell based on the computed one or more pointing angles.

In one such variant, the first location coordinate comprises one or more of a latitude coordinate, a longitude coordinate, and an altitude.

In another such variant, the one or more second location coordinate is received via a message sent from a reference terminal associated with the at least one target coverage cell. In other implementations, the one or more second location coordinates are determined based on a predefined placement.

In still another aspect, a system for coordinating coverage provisioned from one or more aerial platforms for at least one target coverage cell is disclosed. In one such embodiment, the system includes: one or more aerial platforms configured to orbit near the at least one target coverage cell; at least one reference cell associated with the at least one target coverage cell; where the one or more aerial platforms are configured to receive a reference signal generated by the at least one reference cell and responsively determine at least one pointing angle that optimizes a signal quality metric of the received reference signal and generate one or more beams based on the at least one pointing angle.

These and other aspects shall become apparent when considered in light of the disclosure provided herein.

BRIEF DESCRIPTION OF THE DRAWINGS

In the following figures, where appropriate, similar components are identified using the same reference label. Multiple instances of the same component in a figure are distinguished by inserting a dash after the reference label and adding a second reference label.

FIG. 1 is a graphical depiction of an exemplary aerial platform based communications system useful in conjunction with various embodiments described herein.

FIG. 5 is a graphical depiction of an exemplary aerial platform/unmanned aerial vehicle (UAV) at a given altitude and a network of beams formed over the coverage area on the ground.

FIG. 6A is graphical depiction of an exemplary unmanned aerial vehicle (UAV) antenna structure that is configured to form beams toward the coverage area via mechanical actuators.

Figure 2B:
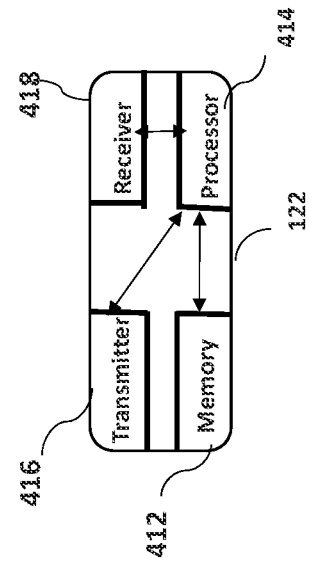
FIG. 2B is a graphical depiction of exemplary radio equipment of a ground terminal useful in conjunction with various embodiments described herein.

All Figures © Copyright 2014 Ubiqomm, LLC. All rights reserved.

DETAILED DESCRIPTION

This disclosure describes aspects of a system designed to provide broadband access. As used herein, the terms "unmanned aerial vehicle" (UAV), "aerial platform", "drone", refer generally and without limitation to: drones, unmanned aerial vehicle (UAV), balloons, blimps, airships, etc. The aerial platforms may comprise propulsion systems, fuel systems, and onboard navigational and control systems. In one exemplary embodiment, the aerial platform comprises a fixed wing fuselage in combination with a propeller, etc. In other embodiments, the aerial platform comprises a robocopter, propelled by a rotor. The aerial platform may carry fuel onboard or function using solar energy.

FIG. 1 shows one exemplary embodiment of an unmanned aerial vehicle (UAV) 110. As shown, the exemplary UAV 110 has a drone radio sub-system 112, a message switch sub-system 116, and at least one drone antenna aperture sub-system 114. UAVs communicate with at least two kinds of ground terminals: one type are user Ground Terminal (GT) 120, such as terminals at home or enterprises to provide internet connectivity to home or enterprise (such as e.g., the Internet); a second type is referred to as the internet Gateway (GTW) 130 which is connected to the Internet. Note that embodiments described below apply to fixed terminals/devices on the ground, as well as mobile terminals/devices attached to platforms such as vehicles, boats, ship, airplanes, trucks, etc., and standalone mobile devices (e.g., handheld devices, etc.). The term "device", as used hereinafter may broadly encompass any of the aforementioned platforms (e.g., the drone 110, the GT 120, and/or the GTW 130). During operation, the UAV is configured to cruise or patrol an "orbit", and provide connectivity between the ground terminal (GT) 120 and other GT 120 and/or gateway terminals (GTW) 130. The GTWs 130 may be connected to broader internet networks 136, thereby allowing the GT 120 internet access and/or access to other GT or GTW.

Figure 2A:
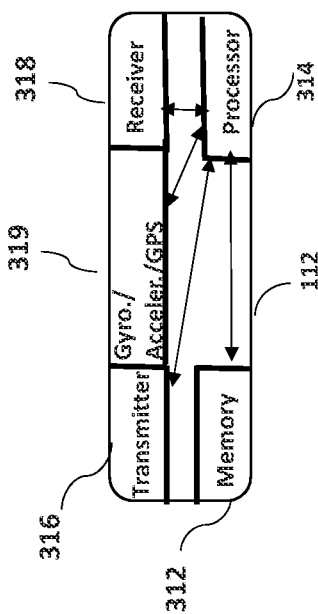
FIG. 2A is a graphical depiction of exemplary radio equipment of an aerial platform useful in conjunction with various embodiments described herein.

FIG. 2A illustrates one exemplary embodiment of an unmanned aerial vehicle (UAV) radio sub-system 112 that includes five (5) sub-systems: a receiver 318 that is configured to demodulate and decode a signal received from a drone antenna aperture sub-system 114; a transmitter 316 that is configured to modulate data received from a processor 314 and send the resulting signal through the drone antenna aperture sub-system 114; a processor sub-system 314 that is configured to carry out functions such as: (i) configuring the receiver 318 and transmitter 316 sub-systems, (ii) processing the data received from the receiver 318 sub-system, (iii) determining the data to be transmitted through the transmitter sub-system 316, and (iv) controlling the antenna sub-system 114; a non-transitory computer readable memory sub-system 312 that is configured to store one or more program code instructions, data, and/or configurations, and system parameter information that are accessed by the processor 314; and a gyroscope/accelerometer/Global Positioning System (GPS) sub-system 319 that is configured to determine a position and orientation of the UAV such as roll/pitch angles.

Depending on the altitude of the UAV, each UAV covers an area on the ground with a radius of as low as a few 10s of kilometers (km) and as much as 200 km or more. GTs 120 transmit and receive data from the internet using the UAV 110 as intermediary to the GTW 130. The UAV's radio sub-system aggregates traffic received from the GTs within the coverage area of the UAV of a population of GTs (in some implementations the UAV may aggregate traffic from as many as all GTs and as few as one GT) and sends the aggregated data to the internet via one or more of the GTWs. Since, the GTWs handle aggregated data from multiple GTs, practical implementations of the present disclosure may support higher data rates between the UAV and the GTW, than between the UAV and the GT. Accordingly, in one embodiment the gain of the GTW antenna sub-system is much larger than that of the GT, and the GTW transmitter transmits at higher power than the GTs. Those of ordinary skill in the related arts will readily appreciate the wide variety of techniques which may be used to increase gain, including without limitation, increasing transmit/receive power, increasing bandwidth, increasing processing gain, increasing coding gain, etc.

Referring back to FIG. 1, the GT 120 has two main sub-systems, a ground terminal radio sub-system 122, and a ground terminal antenna sub-system 124. As shown in FIG. 2B, the GT radio sub-system 122 comprises 4 sub-systems: the receiver 418 that demodulates and decodes the signal from the drone antenna sub-system; the transmitter sub-system 416 that modulates the data and sends the resulting signal through the antenna sub-system 124; the processor sub-system 414 that carries out functions such as: configuring the receiver 418 and transmitter 416 sub-systems, processing the data received from the receiver 418 sub-system, determining the data to be transmitted through the transmitter sub-system 416, as well as controlling the antenna sub-system 124; and the memory sub-system 412 that contains program code, configuration data, and system parameters information that are accessed by the processor 414.

Figure 3:
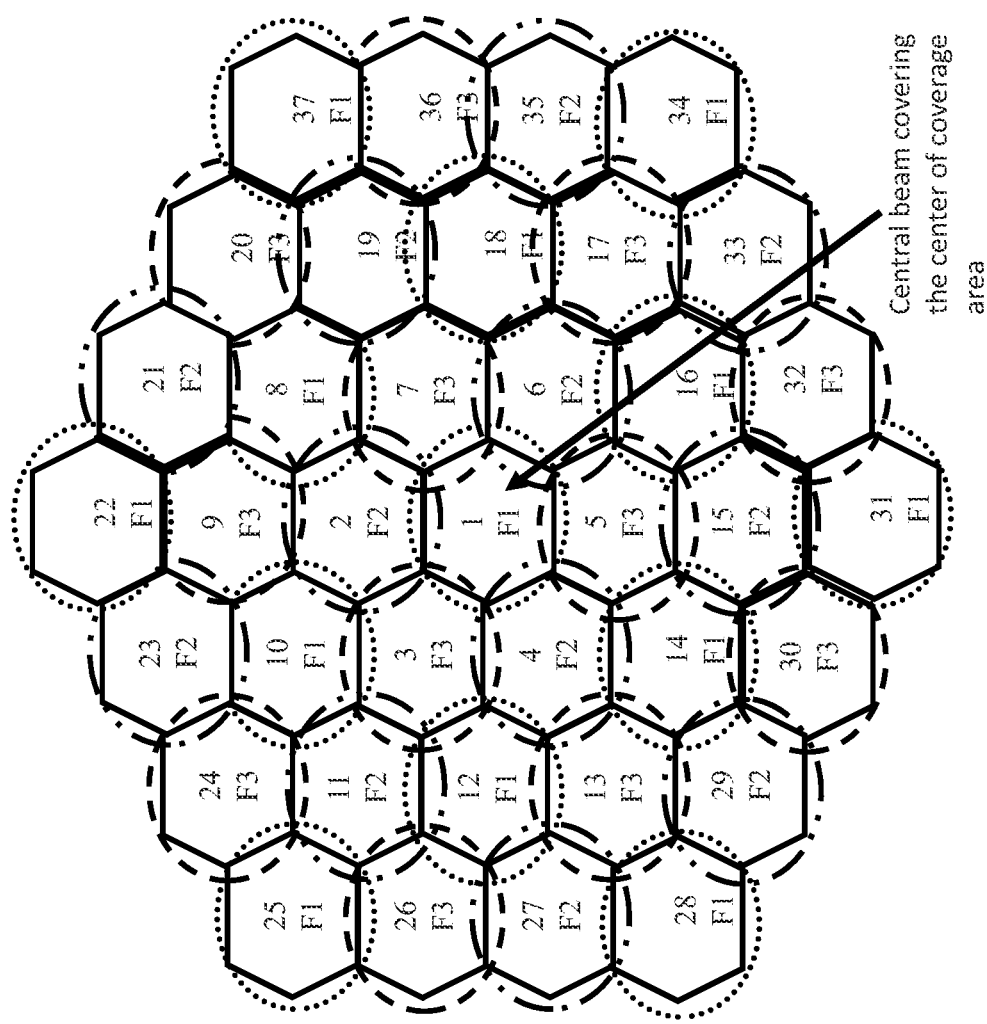
FIG. 3 is a graphical depiction of an exemplary set of beams formed by the aerial platform/UAV on the ground.

The desired target coverage area on the ground is divided into a number of cells; one such exemplary division is shown as an arrangement of thirty seven (37) hexagonal cells in FIG. 3. The aerial platform forms beams to cover each cell on the ground in its target coverage area. As shown, the UAV generates thirty seven (37) beams corresponding to the hexagonal cells; e.g., one (1) "central beam" and three (3) rings of beams around the central beam, on the ground. Hexagons show the ideal coverage of each beam. In reality the beams overlap as shown by the dashed circles. In this exemplary example, the available frequency bandwidth is divided into three (3) bands (F1, F2 and F3), and the three (3) frequency bands are assigned to adjacent beams in such a way that no two neighboring beams use the same frequency. The foregoing frequency allocation scheme is described as having a "frequency reuse" of three (3). The three (3) different dotted circle types indicate beams that use different frequency bands. Those of ordinary skill in the related arts, given the contents of the present disclosure, will readily appreciate that other frequency reuse schemes and/or cell divisions may be interchangeably used with equal success.

Aerial platforms such as UAVs cruise/patrol in a three dimensional space (e.g., latitude, longitude, and altitude). The position of the aerial platform/UAV with respect to the terminals on the ground changes as the aerial platform/UAV moves horizontally and vertically within its cruising orbit (e.g., a circle, figure eight, clover leaf, etc.).

Figure 4:
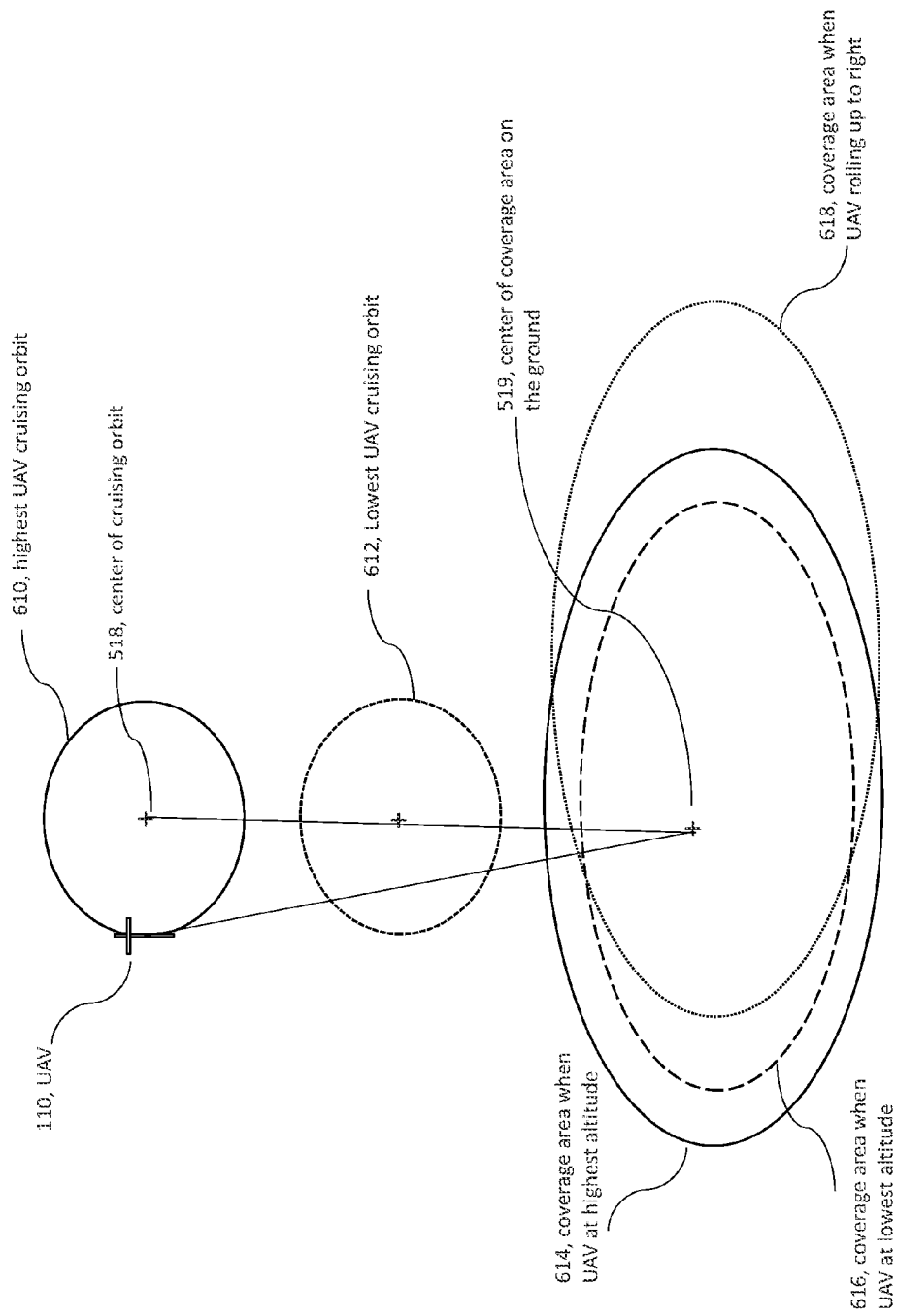
FIG. 4 is a graphical depiction of an exemplary cruising area of the aerial platform/UAV and the related coverage areas on the ground.

Those of ordinary skill will readily appreciate that the beams generated by the UAV radiate out as a function of distance from the UAV, thus if adjustments are not made to the beams generated by the UAV based on movements of the UAV, then the beam footprint will be larger (or smaller) than is desired. For example, if the UAV moves vertically, the coverage area on the ground that is illuminated by the aerial platform/UAV's antenna sub-system 114 will change. FIG. 4 illustrates the cruising area of the aerial platform. The top solid circle 610 shows the cruising orbit of the aerial platform/UAV when the platform is at its highest possible altitude. The lower dotted circle 612 shows the cruising orbit when the platform is at its lowest cruising altitude. For clarity, the overarching hexagonal cells are not shown in the coverage area to simplify FIG. 4 and allow overlay of multiple coverage areas corresponding to different scenarios for comparison thereof as described subsequently herein. During normal operation, the aerial platform cruises within an orbit at a particular altitude; however over the course of the day the aerial platform will move vertically up or down depending on time of day. For instance, solar powered drones may need to run on batter power at night; since the drone must conserve its energy it may reduce its altitude.

Consider one exemplary UAV antenna sub-system that is designed so as to create a fixed set of beams on the ground to cover a certain area shown by the solid circular shape 614 at the bottom of FIG. 4 when the UAV is at the highest altitude. Then, when the UAV moves down to the lowest altitude, the coverage area provided by the set of fixed beam will shrink to a smaller area as shown by dashed circular shape 616 at the bottom of FIG. 4. For instance, in one practical implementation, the highest altitude of the UAV is 25 km and the radius of the coverage of the UAV on the ground is planned for 25 km. If the aerial platform's antenna beams are static/fixed, then as the UAV moves down to the altitude of 20 km the coverage area of the UAV will also shrink to 20 km on the ground. In order to compensate for this reduction in coverage, the aerial platform antenna system should be designed, as described later in this disclosure, to ensure that the desired target coverage area is always illuminated as the UAV altitude changes. While the foregoing example is presented within the context of altitude changes, those of ordinary skill in the related arts given the contents of the present disclosure will readily appreciate, that the aerial platform/UAV may also change its orientation, such as its roll/pitch/yaw, as it cruises in its orbit. If the beams formed by the aerial platform's antenna sub-system are static/fixed, then as the aerial platform rolls up toward one side, the coverage area illuminated by the UAV's antenna sub-system 110 will correspondingly shift and some areas in the target coverage area may lose coverage. The dotted shape 618 at the bottom of FIG. 4 shows how the coverage area has shifted to the right when the aerial platform rolls up toward the right side.

Therefore, in order to provide coverage in a desired target area on the ground at all time, the aerial platform beam generation and beam pointing mechanism must take into account at least three types of aerial platform/UAV movements (or six degrees of freedom): (i) horizontal motion (e.g., a circular cruising orbit), (ii) vertical motion, and (iii) orientation (roll, pitch, yaw).

Static Fixed Beam Example #1

To these ends, in one exemplary aspect of the present disclosure an aerial platform is configured statically with fixed beams so as to accommodate coverage deviations due to e.g., changes in (i) horizontal motion (e.g., a circular cruising orbit), (ii) vertical motion, and (iii) orientation (roll, pitch, yaw). In one such embodiment, the aerial platform's antenna sub-system forms static/fixed beams are not changed dynamically based on orientation or altitude of the platform; instead, the aerial platform ensures coverage regardless of the altitude and orientation by creating more beams when the platform is at the lowest altitude (or worst case altitude). In other words, the fixed/static beams are designed to ensure coverage at the lowest altitude (or orientation).

In another embodiment, the aerial platform creates enough beams to cover the target coverage area on the ground for the condition where the aerial platform is at the altitude half way between the highest and the lowest altitudes. Note that typically the beam's gain at the cell edge is 2 to 3 dB lower than that of peak gain at the center of the cell, and the beam's gain rolls off beyond the cell edge. Therefore, the aerial platform beam will provide coverage to terminals that are placed beyond the cell edge, but at lower gains than at the cell edge. In this case, as the aerial platform moves to the lowest altitude the coverage area of the beams shrink but since, as mentioned above, the beams do provide coverage in a larger area than the specific cell, then the target coverage area will receive service but at lower beam gain. As the aerial platform moves to the highest altitude, the beams expand and cover a larger area than the target coverage area. In cases where the difference between the highest and lowest altitudes are relatively small, then one need not turn off any beams when aerial platform is at the highest altitude as the extra coverage beyond the target area will be small.

In some implementations, the static fixed beam approach may create other problems; for example, when the UAV moves to the highest altitude then its beam will expand outside the target coverage area, which will result in inefficient use of the UAV communications resources. Additionally, more beams must be added to take into account the maximum roll the platform may undergo at the lower altitude. These extra beams are not used when the platform is at the highest altitude and low roll angles, further reducing efficiency. For illustration, consider the example of the highest and lowest possible platform altitudes of 25 and 20 km, and a target coverage area on the ground of radius 25 km. According to the aforementioned static/fixed aerial platform beam design, the drone must be designed with enough beams to cover an area of radius ~31.25 km on the ground when the platform is at 25 km altitude so that when the platform descends to a 20 km altitude a coverage area of at least 25 km will be maintained on the ground. In this example the drone must provide about 56% more coverage than is needed at the highest altitude, in order to ensure adequate coverage at the lowest altitude. Note that if the difference between the highest and lowest platform altitude is more than 5 km, then as this inefficiency becomes even more exaggerated. Additional beams will also be needed to account for the platforms roll. Under such a design methodology, the drone may need to support twice the number of beams for undesirable conditions (e.g., at lowest altitude and high UAV roll angles) as would be needed for the optimal conditions (e.g., at highest altitude and low UAV roll angles).

Accordingly, the following variants provide improved schemes for aerial platform beam forming techniques to dynamically adjust the beams of the aerial platform/UAV depending on the horizontal displacement, altitude, and orientation of the platform, in order to minimize the number of beams needed. Consider first the effect of the movement of the aerial platform around the circle. The projected network of beams, such as the one illustrated in FIG. 5, will follow the aerial platform's movement around its circular cruising orbit 610. For example, the center of the coverage area 519 on the ground is the projection of the center of the circular orbit of the aerial platform/UAV 518. The antenna fixture 114 that is installed under the aerial platform/UAV is fixed and will not directly point toward the center of coverage 519 on the ground. Accordingly, the aerial platform antenna beam forming and beam pointing mechanism should be designed to ensure that the beams formed by the aerial platform cover the coverage area 614 on the ground given the relative location of the aerial platform/UAV, and its antenna fixture, with respect to the center 519 of desired coverage area on the ground.

In one such variant, the extra beams are unnecessary when the platform is at the highest altitude and/or low roll angles. To these ends the aerial platform may simply enable/disable the extra beams based on altitude and/or orientation angle. For example, above a first altitude threshold, the extra beams are disabled, below a second altitude the extra beams are enabled. The first and second thresholds may be further selected to provide some hysteresis (e.g., to prevent beam "flickering"). Similarly, extra beams may be enabled/disabled based on orientation angles.

In another exemplary variant, the aerial platform may form/point beams to compensate for altitude/orientation. For example, in one such embodiment, the aerial platform forms a beam to cover the central cell 1 shown with dashed line in FIG. 5. One such implementation may point a beam toward the center of the coverage area based on knowledge of the position location coordinates and the roll of the aerial platform. For example, the aerial platform may use an onboard gyroscope/accelerometer/Global Positioning System (GPS) sub-system 319 to determine the orientation and position coordinates of the aerial platform. The aerial platform processor sub-system 314 uses the determined position location and orientation of the aerial platform as well as the position coordinates of the center of the coverage area to calculate the angle 810 from a line from the aerial platform to the center of the coverage area relative to a line perpendicular from aerial platform to ground, and instructs the radio sub-system 112 and the antenna sub-system 114 to point its beam toward the central cell 1 at the computed angle.

While the scenario shown in FIG. 5 does not show any aerial platform roll, pitch, or yaw, those of ordinary skill, given the contents of the present disclosure, will readily appreciate that the angle of the beam from the aerial platform must also take into account the orientation angle of the platform in addition to the angle 810. The orientation angle must be subtracted or added to angle 810 depending on the platform orientation.

Next, the aerial platform can calculate appropriate beam projections for the remaining cells of the desired target coverage area on the ground. First, the center of the cells of the remaining rings of cells, shown in FIG. 5, can be calculated relative to the center of the central cell based on the desired target coverage area. Once the centers of cells for the rings of cells are computed, then a beam from the aerial platform can be pointed toward the center of each cell by computing the required pointing angle from the antenna at the aerial platform to the center of each cell. Once the network of beams have been pointed, then as the aerial platform moves around the circle, the network of beams on the ground also move around the center of the central beam. In other words, as the aerial platform/UAV moves around a circular orbit, the network of beams will continue to cover the desired coverage area.

Reference Cell Example #2

In a second aspect of the present disclosure, the aerial platform is assisted by a reference terminal 120 in a location close to the desired center of coverage area, e.g., substantially at the center of cell 1 in FIG. 5. In some variants, the reference terminal is incorporated within a GT 120 or GTW 130, in other variants the reference terminal is a standalone terminal. While the following examples are provided with respect to a centrally located reference terminal, it is appreciated that a reference terminal which is not centrally located may be equally suitable, so long as the drone is appraised of the reference terminal's displacement from the center of coverage. In some cases, the displacement may be provided by the reference terminal itself; in other cases, the central cell displacement may be dynamically determined by the drone (or e.g., network operator).

In one such embodiment, the reference terminal has an antenna that radiates a reference signal throughout the three dimensional space within which the aerial platform/UAV cruises. The aerial platform antenna sub-system 114 forms a beam toward the general area of the center of the coverage in order to search for the reference terminal. Specifically, the reference terminal 120 transmits a reference signal 222 that is received by the aerial platform 110 radio sub-system 112. The aerial platform radio sub-system 112 measures a signal quality metric of the received reference signal 222, such as Signal to Interference plus Noise Ratio (SINR). Other examples of signal quality metrics include without limitation: received signal strength indication (RSSI), bit error rate (BER), block error rate (BLER), etc.

Next the aerial platform 110 antenna sub-system 114 perturbs or adjusts the position of the central beam toward the reference terminal and makes a measurement of the signal quality of the received reference signal 222. If the measured signal quality (such as SINR) is higher at the perturbed beam position, then the aerial platform antenna sub-system 114 uses the new beam position as the nominal beam position for the central beam. The aerial platform 110 radio sub-system 112 continues to measure signal quality from reference signal 222, and instructs the antenna sub-system 114 to perturb the position through a search pattern (e.g., a grid search, etc.) to find the "optimal" position of the central beam. The optimal central beam position should maximize the received signal quality from the reference terminal 120. In some embodiments, the signal quality measurements made by the radio sub-system 112 at the different central beam positions may be sent to the processor sub-system 314 for analysis. The processor sub-system 314 may then run a number of algorithms on the measured signal quality values in order to find the optimal beam pointing angle for the central cell.

Once the central beam is pointed toward the center of the coverage area (cell 1 in FIG. 5) as described above, the aerial platform 110 radio sub-system 112 and processor sub-system 314 determine the pointing angles for the beams toward cells in the other rings surrounding the central cell. In one embodiment of the disclosure, the processor sub-system 314 has knowledge of the position location coordinates and orientation angles of the aerial platform, and the location coordinates of the desired centers of the other cells. Then, the processor sub-system 314 may compute the required pointing angle from the antenna sub-system 114 for beams toward the different cells and instruct the antenna sub-system 114 to point the beams at the computed pointing angles toward each cell.

Relative Positioning Example #3

In yet another aspect of the disclosure, the aerial platform radio sub-system 112 and processor 314 may determine the beam pointing angles for each beam in the network relative to the central beam without direct knowledge of the position coordinates of the aerial platform. The aerial platform radio sub-system 112 makes a Round Trip Delay (RTD) measurement with the reference terminal radio sub-system 124. To measure the RTD, the aerial platform radio sub-system 112 measures the time of arrival of the reference signal 222 transmitted by the reference terminal 120, and in turn transmits a message 212 to the reference terminal 120. The reference terminal 120 measures the time of arrival of the message 212, and computes the RTD based on the time of transmission of reference signal 222 and time of arrival of message 212. Those of ordinary skill in the related arts will readily appreciate that the RTD measurement may be performed in a variety of other manners, the foregoing being purely illustrative.

Since there may be processing and transmission queuing delays at the aerial platform radio sub-system 112 before the message 212 is transmitted to the reference terminal 120 in response to reception of reference signal 222; in order to improve accuracy, the radio sub-system 112 may include the processing and transmission delays (or a best estimate thereof) in the message 212 sent to the reference terminal. Thereafter, reference terminal 120 can appropriately correct the delays due to processing/queuing delays in computing the RTD values.

The processor 314 uses the RTD measurement to estimate the distance from the aerial platform 110 to the reference terminal 120 (e.g., based on the rate of propagation of radio waves). FIG. 5 illustrates the cruising orbit of the aerial platform/UAV and the beam network on the ground relative to the UAV. Since the aerial platform/UAV cruises in a small circle 610 around a point 518 above the center of coverage, and the altitude of the aerial platform/UAV is much larger than the radius 516 of the cruising orbit, then the distance from the UAV to the center of coverage 512 as measured by the RTD is very close to the actual altitude of the aerial platform 514. Therefore, the distance measured by the RTD as described above can be used as a close approximation to the altitude of the UAV 110. The processor 314 has knowledge of the desired centers of the different beams on the ground for a given altitude of the UAV. For instance, once the aerial platform 110 has formed a beam on the reference terminal, then the reference terminal 120 may send information on the number of cells and the center of cells for different altitudes to the aerial platform 110. Then, the aerial platform processor 314 uses position coordinates of the center of each cell in the surrounding rings (or tiers) of cells relative to the center cell, the orientation angle of the UAV, and altitude of the UAV to compute the required pointing angle of the beams from the aerial platform antenna sub-system 114 toward the center of each cell. Once the pointing angle from the antenna sub-system 114 toward each cell center is computed by the processor 314, then the antenna sub-system points beams toward each cell at the computed pointing angles.

Narrow Beam Reference Cell Example #4

In another aspect of the disclosure, the reference terminal may have a narrow beam width antenna beam which may not cover the entire three dimensional space within which the aerial platform cruises. Depending on the relative position of the aerial platform and the direction the reference terminal is pointing its beam, the aerial platform radio sub-system 112 may not be able to detect the reference signal 222 from the reference terminal 120.

In one exemplary embodiment, in order to ensure that the reference terminal 120 is pointing a beam toward at least part of the cruising orbit of the UAV, the reference terminal processor sub-system 314 divides the space that contains the UAV's three dimensional cruising area into sub-regions. Each sub-region is small enough so that the aerial platform's beam can respond within the sub-region when the aerial platform's beam receives the reference signal. During a search, the reference terminal antenna sub-system 124 iteratively points its beam toward different sub-regions, and in each sub-region the reference terminal radio sub-system 122 searches for the reference signal response 212 sent by the aerial platform 110. In one such variant, the reference terminal maintains its beam fixed in each sub-region for the duration of the UAV's orbit, so that the UAV will have made at least one complete orbit during the search. This ensures that the UAV and the reference terminal beams will be aligned long enough to allow detection of reference signal 212 by the reference terminal radio sub-system 122, and that the reference terminal 120 will be able to detect the aerial platform's reference signal 212 when the aerial platform enters the sub-region. This search process continues until the reference terminal's radio sub-system 122 detects the reference signal response 212 from the aerial platform 110. Once the reference terminal 120 has detected the reference signal response 212, then it sends a message 222 to the aerial platform. Thereafter, the aerial platform 110 may optimize the pointing of its central beam toward the central cell using one of the embodiments described above. Since the aerial platform is moving in its cruising orbit, the aerial platform central beam pointing process and RTD measurements must be carried out during the time period when the reference terminal's beam is pointing toward the aerial platform.

After the initial pointing of the aerial platform's beams toward the different cells on the ground using the systems and methods described in the above embodiments, the aerial platform 110 sub-systems will continue to update the position location coordinates, orientation angle, and altitude of the platform. Based on the updates of the UAV position location and orientation angles, the aerial platform sub-systems may compute new beam pointing angles toward each cell and adjust each beam accordingly.

Beam Pointing Techniques—

The above embodiments described systems and methods for determining the pointing angle of each of the aerial platform's beams toward the different cells in the desired target coverage area on the ground. Various schemes for pointing antenna beams are now described in greater detail.

FIG. 6A shows an exemplary antenna fixture for actuator based beam forming. As shown, the exemplary antenna fixture is composed of 7 faces, labeled as 116-$j$ where j is the index of the different faces j=1 . . . , 7. Face 160-1 covers the area under the aerial platform that is closer to the center of coverage. The trapezoidal base of the antenna fixture is attached to underneath the aerial platform. Faces 116-2 through 116-6 cover areas that are father from the center of coverage of the UAV. Each antenna face 116-$j$ comprises multiple antenna sub-apertures 117-$k$, where k is the label of different sub-apertures. Each sub-aperture 117-$k$ generates one beam toward one cell of the coverage area. Each antenna sub-aperture 116-$j$ is attached to an actuator 119-$k$ which is controlled by processor 314. Once the processor 314 has computed the pointing angles of each antenna sub-aperture 116-$k$, it instructs the actuator 119-$k$ to tilt the sub-aperture 117-$k$ according to the computed pointing angle.

Figure 6C:
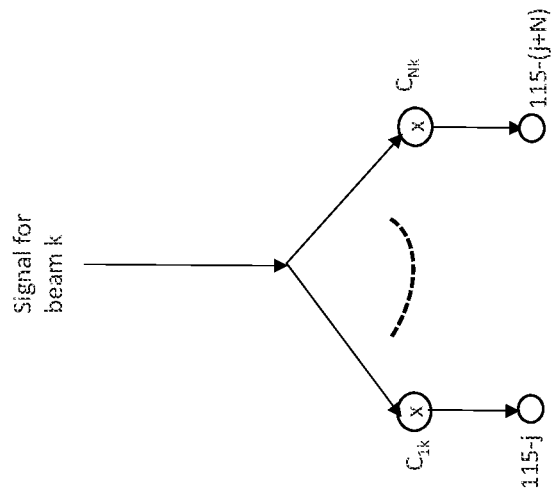
FIG. 6C is graphical depiction of a phased array beam forming approach useful in conjunction with the phased array antenna structure of FIG. 6B.
Figure 6B:
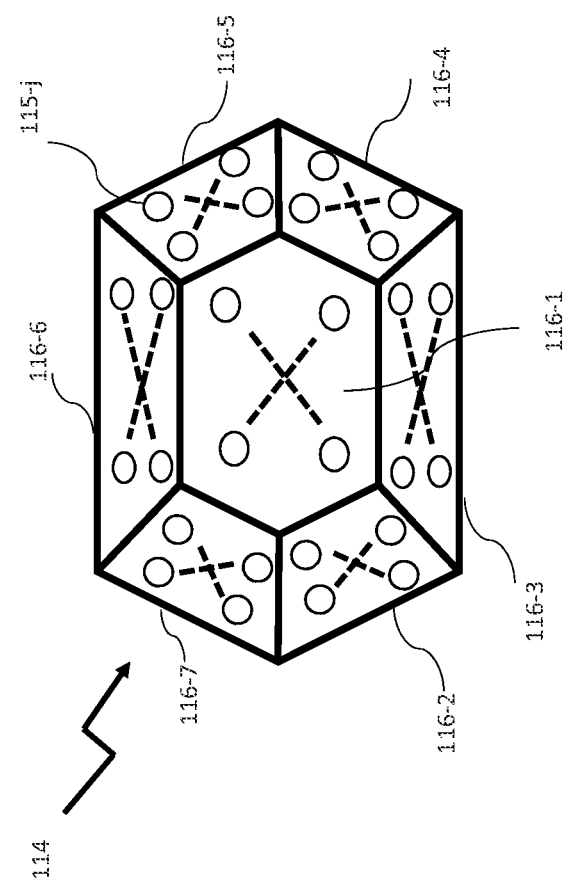
FIG. 6B is graphical depiction of an exemplary unmanned aerial vehicle (UAV) phased array antenna structure that is configured to form beams toward the coverage area via electronic beam forming.

In one aspect of the antenna system design, the antenna beam is electronically formed via e.g., a phased array, to point the beams that cover each cell on the ground. As shown in FIG. 6B, each antenna face contains multiple antenna elements 115-$j$ spaced at substantially half the transmission and/or reception wavelength, where j is the label of the different antenna elements. In most practical applications, the transmission and reception wavelengths are not significantly different (e.g., only differing by a few megahertz, at gigahertz frequency carrier ranges), accordingly the half wavelength distance is predominantly based on the carrier frequency. However, those of ordinary skill in the related arts will readily appreciate, given the contents of the present disclosure, that where the transmission and reception wavelengths are substantially separated, the half wavelength distance would be different between transmission and reception antenna fixtures.

Once the processor 314 has computed the pointing angles for beams toward each cell on the ground, it instructs the antenna sub-system 114 to form beams toward each cell at the corresponding pointing angles. FIG. 6C illustrates a phased array beam forming approach where the antenna sub-system 114 forms each beam by multiplying the signal destined for the k-th beam by coefficients $C_{jk}$ (j=1 . . . , N) and sending the results to a subset of N antenna elements 115-1 through 115-N.

Artisans of ordinary skill in the related arts, given the contents of the present disclosure, will readily appreciate that other mechanical and/or electronic beam forming/pointing antenna structures may be interchangeably and/or additionally used in conjunction with the mechanical and/or electronic beam forming/pointing antenna design described above. Various other antenna element structures such as metamaterials, slot arrays, etc, may also be used with equal success.

Figure 7:
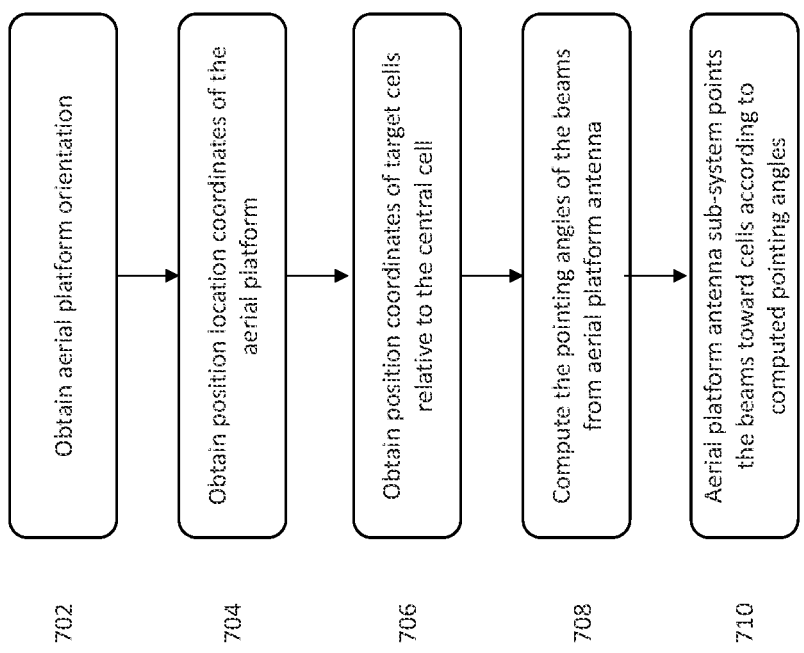
FIG. 7 is a logical flow chart of one exemplary process for determining the beam pointing angles from the unmanned aerial vehicle (UAV) toward the different cells on the ground.

FIG. 7 is a flow chart of one exemplary method for determining pointing angles toward each cell from the aerial platform/UAV.

In step 702, the processor 314 obtains the aerial platform's orientation. In one exemplary embodiment, the orientation includes one or more of a roll angle, pitch angle, and/or yaw angle.

In one exemplary embodiment, the aerial platform's orientation is determined on the basis of one or more of a Global Position System (GPS), accelerometers, gyroscopes, etc. Various other mechanisms useful for determining position are readily appreciated by those of ordinary skill in the related arts, given the contents of the present disclosure.

In step 704, the processor 314 obtains information on the position location of the aerial platform. In one exemplary embodiment the position includes one or more of horizontal (e.g., latitude, longitude) and vertical (e.g., altitude) coordinates. In one exemplary implementation, the position coordinates are obtained from a Global Positioning System (GPS). In other implementations, the position coordinates may be obtained by triangulating time of arrival measurements received from the radio sub-system 122 which are received signals from e.g., multiple reference terminals.

In step 706, the processor sub-system 314 determines one or more position coordinates of target cells. In one exemplary embodiment, the one or more position coordinates may be received from a message sent by ground terminal. In other embodiments, the one or more position coordinates may be independently derived based on e.g., a predefined placement. In one exemplary predefined placement, the one or more position coordinates correspond to thirty seven (37) cells arranged in a hexagonal pattern of three (3) concentric rings surrounding a central cell. In still other embodiments, the processor sub-system 314 may independently determine when to enable/disable various target cells so as to e.g., reduce power, improve cellular coverage efficiency, reduce interference, etc.

In step 708, processor 381 computes the pointing angle from the aerial platform antenna system toward each cell. In one exemplary embodiment, the pointing angle is determined on the basis of trigonometric properties, using the determined location coordinates and orientation angles. In other embodiments, the optimal pointing angle is determined based on a search (e.g., by testing multiple perturbations to determine an optimal pointing angle).

In step 710, the aerial platform antenna sub-system points its beams in accordance with the computed pointing angles. In one embodiment, the pointing is mechanically actuated. In other embodiments, the pointing is electronically performed via a phased array.

Figure 8:
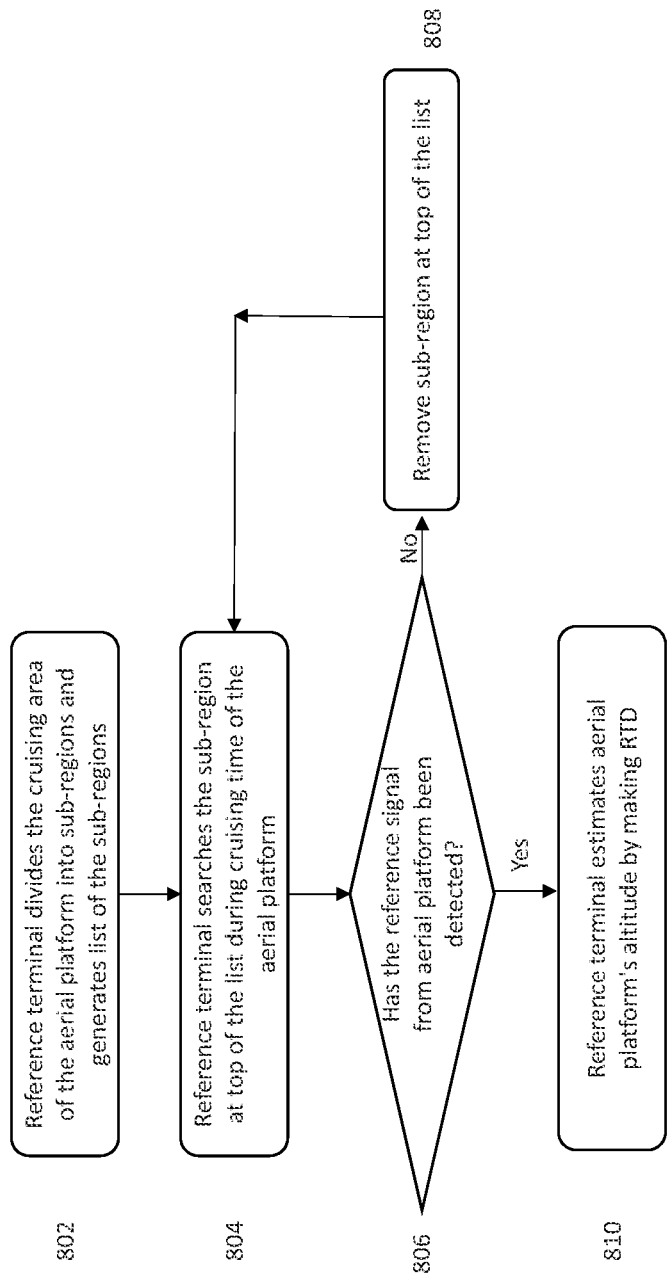
FIG. 8 is a logical flow chart of one exemplary process for determining the altitude of the unmanned aerial vehicle (UAV) according to an aspect of the disclosure.

FIG. 8 is a flow chart of one exemplary method for ensuring that an antenna of a reference terminal with a narrow beam width will point to a sub-region of the cruising area of the aerial platform so that at least for a certain period of time the aerial platform and the reference terminal radio sub-systems can communicate and make RTD measurements.

In step 802, the reference terminal processor sub-system divides the cruising area of the platform into contiguous sub-regions and creates a list of the sub-regions. In one embodiment, the division is evenly split based on geography. In other embodiments, the division is unevenly split based on an estimated likelihood of the UAV. For example, if the reference terminal believes that a UAV is within a certain space (e.g., based on recent history, out-of-band signaling, etc.), then the reference terminal may allocate a disproportionate amount of its search resources (e.g., time, power, bandwidth, etc.) accordingly.

When an aerial platform successfully receives the reference signal, it responsively transmits a response. Accordingly, at step 804, the reference terminal points its antenna beam toward a sub-region, and searches for the response to the reference signal sent by the aerial platform. In one exemplary embodiment, the reference terminal searches within the sub-region for a duration of time which is substantially equal to the cruising orbit duration of the aerial platform. In other embodiments, the duration is selected so as to maximize the probability of receiving a response to reference signal from the aerial platform. In embodiments where there are multiple aerial platforms, it may not be possible to align search periods with any single drone's orbital duration; however, the reference terminal may intelligently select a period so as to maximize discovery.

In step 806, the reference terminal determines whether the reference signal from the aerial platform has been detected. If the aerial platform's reference signal has been detected, the process moves to step 810 where the aerial platform and reference terminal perform round trip delay (RTD) measurements to determine the altitude of the UAV.

If the reference terminal has not detected the reference signal from the aerial platform in 804, the process moves to step 808 where the recently checked sub-region is removed from the top of the list of sub-regions. The process then moves to step 804 where the reference terminal searches for the sub-region at the top of the new list.

Figure 9:
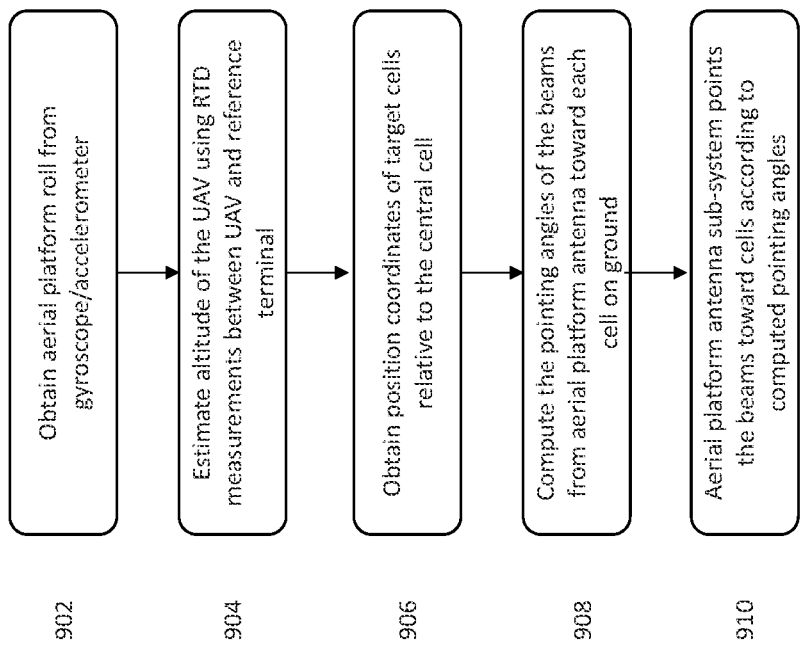
FIG. 9 is a flow chart of one exemplary process for determining the beam pointing angles from the UAV toward the different cells on the ground.

FIG. 9 is a flow chart of one exemplary method for determining pointing angles toward each cell on the ground from the aerial platform/UAV using a reference terminal to assist in pointing beams.

In step 902, the processor 314 obtains the aerial platform's orientation from the gyroscope/accelerometer sub-system 319. In one exemplary embodiment, the aerial platform's orientation is determined on the basis of one or more of a Global Position System (GPS), accelerometers, gyroscopes, etc. Various other mechanisms useful for determining position are readily appreciated by those of ordinary skill in the related arts, given the contents of the present disclosure.

In step 904, the processor 314 estimates the altitude of the aerial platform using Round Trip Delay (RTD) measurements between the aerial platform's radio sub-system 112 and a reference terminal's radio sub-system 124.

In step 906, the processor sub-system 314 determines one or more position coordinates of target cells. In one exemplary embodiment, the one or more position coordinates may be received from a message sent by ground terminal. In other embodiments, the one or more position coordinates may be independently derived based on e.g., a predefined placement. In one exemplary predefined placement, the one or more position coordinates correspond to thirty seven (37) cells arranged in a hexagonal pattern of three (3) concentric rings surrounding a central cell.

In still other embodiments, the processor sub-system 314 may independently determine when to enable/disable various target cells so as to e.g., reduce power, improve cellular coverage efficiency, reduce interference, etc.

In step 908, processor 314 computes the pointing angle from the aerial platform antenna system toward each cell on the ground using the estimated altitude, orientation, and position coordinates of the cells.

In step 910, the aerial platform antenna sub-system adjusts, either mechanically or electronically, the position of each beam toward the target cell based on the computed pointing angle.

It will be recognized that while certain aspects of the disclosure are described in terms of a specific sequence of steps of a method, these descriptions are only illustrative of the broader methods of the disclosure, and may be modified as required by the particular application. Certain steps may be rendered unnecessary or optional under certain circumstances. Additionally, certain steps or functionality may be added to the disclosed embodiments, or the order of performance of two or more steps permuted. All such variations are considered to be encompassed within the disclosure disclosed and claimed herein.

While the above detailed description has shown, described, and pointed out novel features of the disclosure as applied to various embodiments, it will be understood that various omissions, substitutions, and changes in the form and details of the device or process illustrated may be made by those skilled in the art without departing from the disclosure. This description is in no way meant to be limiting, but rather should be taken as illustrative of the general principles of the disclosure. The scope of the disclosure should be determined with reference to the claims.

It will be further appreciated that while certain steps and aspects of the various methods and apparatus described herein may be performed by a human being, the disclosed aspects and individual methods and apparatus are generally computerized/computer-implemented. Computerized apparatus and methods are necessary to fully implement these aspects for any number of reasons including, without limitation, commercial viability, practicality, and even feasibility (i.e., certain steps/processes simply cannot be performed by a human being in any viable fashion).

What is claimed is:

1. An unmanned aerial vehicle (UAV) apparatus configured to form antenna beams toward at least one target coverage cell, comprising:
    an antenna fixture configured to form at least one beam;
    a set of radio transmitters and receivers configured to transmit and receive signals to a set of ground terminals within the at least one target coverage cell;
    a processor sub-system; and
    a non-transitory computer readable medium comprising one or more instructions which, when executed by the processor sub-system, is configured to cause the UAV apparatus to:
        generate the at least one beam that covers the at least one target coverage cell; and
        wherein the generated at least one beam encompasses at least one ground terminal of the set of ground terminals;
    wherein the non-transitory computer readable medium is further configured to cause the UAV apparatus to store one or more first position location coordinates corresponding to one or more coverage areas;
    wherein for at least one coverage area of the one or more coverage areas, the non-transitory computer readable medium is further configured to cause the UAV apparatus to store one or more second position location coordinates of target cells relative to a center of the at least one coverage area; and
    wherein the non-transitory computer readable medium further comprises one or more instructions that are configured to cause the UAV apparatus to:
        obtain one or more third position location coordinates and orientation angles of the UAV apparatus based on at least one of a gyroscope, an accelerometer and a position location sub-system; and
        compute one or more pointing angles from the antenna fixture toward the target cells based at least in part on the second position location coordinates, the third position location coordinates, and the orientation angles of the UAV apparatus.

2. The UAV apparatus of claim 1, where:
    the antenna fixture is comprised of multiple antenna sub-apertures, where each antenna sub-aperture is configured to form at least one beam;
    where each antenna sub-aperture is controlled by a corresponding actuator; and the one or more instructions are further configured to cause the corresponding actuators to:
point each antenna sub-aperture toward a corresponding cell according to the one or more computed pointing angles.

3. The UAV apparatus of claim 1, where:
the antenna fixture is comprised of multiple antenna elements spaced apart at substantially half wavelength distances;
an antenna sub-system comprises circuitry configured to phase the multiple antenna elements to form and point beams; and
where the one or more instructions are further configured to cause the antenna sub-system to point the beams according to the one or more computed pointing angles.

4. The UAV apparatus of claim 2, where:
the antenna fixture comprises multiple antenna elements spaced apart at substantially half wavelength distances;
an antenna sub-system is configured to phase the multiple antenna elements to form and point beams.

5. The UAV apparatus of claim 1, wherein the one or more instructions are further configured to cause the UAV apparatus to:
compute a required number of fixed beams to cover the at least one target coverage cell under a plurality of UAV altitudes and orientation angles; and
wherein the generated at least one beam comprises the computed number of fixed beams.

6. The UAV apparatus of claim 1, where:
the antenna fixture is configured to receive a reference signal from a reference terminal associated with the at least one target coverage cell;
the antenna fixture is further configured to measure one or more signal quality measurements based on the reference signal received from the reference terminal; and
wherein the computed one or more pointing angles toward the reference terminal optimize the measured one or more signal quality measurements.

7. The UAV apparatus of claim 6, wherein the one or more instructions are further configured to cause the UAV apparatus to:
determine one or more second position location coordinates of target cells in one or more rings of cells surrounding a central cell associated with the at least one target coverage cell.

8. The UAV apparatus of claim 7, wherein the one or more instructions are further configured to cause the UAV apparatus to:
estimate an altitude of the UAV apparatus based at least in part on the one or more third position location coordinates of the UAV; and
compute the one or more pointing angles for each one of the at least one beam from the UAV apparatus based at least in part on the orientation angles, the estimated altitude, and the one or more second position location coordinates of target cells in the one or more rings of cells surrounding the central cell.

9. A method for forming antenna beams toward at least one target coverage cell, comprising:
determining a first location coordinate of an aerial platform;
determining an orientation of the aerial platform;
identifying one or more second location coordinates associated with the at least one target coverage cell;
wherein for at least one coverage area of the at least one target coverage cell, identifying one or more third location coordinates of surrounding cells relative to the at least one target coverage cell; and
computing one or more pointing angles toward the at least one target coverage cell and the surrounding cells based at least in part on the first location coordinate, the second location coordinates, the one or more third location coordinates, and the orientation of the aerial platform; and
generating at least one beam that covers the at least one target coverage cell and the surrounding cells based on the computed one or more pointing angles.

10. The method of claim 9, wherein the determining the first location coordinate comprises determining one or more of a latitude coordinate, a longitude coordinate, and an altitude.

11. The method of claim 10, wherein the identifying the one or more second location coordinates comprises receiving a message sent from a reference terminal associated with the at least one target coverage cell.

12. The method of claim 10, wherein the one or more second location coordinates are determined based on a predefined placement.

13. A system for coordinating coverage provisioned from one or more aerial platforms for at least one target coverage cell and one or more surrounding cells relative to the at least one target coverage cell, comprising:
one or more aerial platforms configured to orbit near the at least one target coverage cell;
at least one reference cell associated with the at least one target coverage cell;
wherein the one or more aerial platforms are configured to receive a reference signal generated by the at least one reference cell and responsively determine at least one pointing angle that optimizes a signal quality metric of the received reference signal and generate one or more beams based on the at least one pointing angle; and
wherein the one or more aerial platforms are further configured to:
determine one or more first position location coordinates corresponding to the at least one target coverage cell;
determine one or more second position location coordinates of one or more surrounding cells relative to the at least one target coverage cell; and
obtain one or more third position location coordinates and orientation angles of the one or more aerial platforms based on at least one of a gyroscope, an accelerometer and a position location sub-system; and
wherein the computed at least one pointing angle is based on computing one or more pointing angles from the one or more aerial platforms toward the at least one target coverage cell and one or more surrounding cells based at least in part on the second position location coordinates, the third position location coordinates, and the orientation angles.

14. The system of claim 13, wherein the one or more aerial platforms are configured to generate a beam which is narrower than an orbit one or more aerial platforms.

15. The system of claim 14, wherein the one or more aerial platforms are configured to iteratively generate the beam within at least one sub-region of the orbit.

16. The system of claim 15, wherein the iteratively generated beam within the at least one sub-region is generated for a duration of time which is substantially equal to a cruising orbit duration of the one or more aerial platforms.

17. The system of claim 13, wherein the one or more aerial platforms are configured to generate a beam which completely encompasses an orbit of the one or more aerial platforms.

18. The system of claim 13, wherein the at least one reference cell is further configured to transmit one or more location coordinates corresponding to one or more target cell coverage areas.

* * * * *